(12) United States Patent
Wians et al.

(10) Patent No.: US 8,281,914 B2
(45) Date of Patent: Oct. 9, 2012

(54) AUGER BRAKE CLUTCH AND DRIVE ASSEMBLY AND RELATED METHODS

(75) Inventors: Jeffrey A. Wians, Mebane, NC (US); Kevin D. King, Chapel Hill, NC (US); Christopher W. Vaughn, Mebane, NC (US)

(73) Assignee: Honda Motor Co., Ltd., Tokyo (JP)

(*) Notice: Subject to any disclaimer, the term of this patent is extended or adjusted under 35 U.S.C. 154(b) by 613 days.

(21) Appl. No.: 12/490,029

(22) Filed: Jun. 23, 2009

(65) Prior Publication Data
US 2010/0319223 A1    Dec. 23, 2010

(51) Int. Cl.
*F16D 67/02* (2006.01)
*F16H 15/10* (2006.01)
*E01H 5/09* (2006.01)

(52) U.S. Cl. ............. 192/14; 192/18 R; 476/58; 476/69

(58) Field of Classification Search .................... 192/14, 192/16; 37/249, 257; 476/56, 57, 58, 68, 476/69, 33, 29, 30; 56/11.1; 180/368
See application file for complete search history.

(56) References Cited

U.S. PATENT DOCUMENTS

| | | | |
|---|---|---|---|
| 3,580,351 A * | 5/1971 | Mollen .......................... 180/53.7 |
| 3,613,815 A * | 10/1971 | Meylink et al. .............. 180/53.1 |
| 3,813,954 A | 6/1974 | Price et al. |
| 4,396,081 A * | 8/1983 | Hochwitz et al. ............. 180/19.3 |
| 4,404,864 A * | 9/1983 | Parikh ............................. 476/57 |
| 4,514,917 A * | 5/1985 | Ogano et al. ...................... 37/249 |
| 6,464,055 B1 * | 10/2002 | Wians ............................ 192/18 R |
| 6,615,964 B2 * | 9/2003 | Osborne et al. ............. 192/18 R |
| 6,827,188 B2 * | 12/2004 | Patridge ........................... 192/15 |
| 2005/0109002 A1 * | 5/2005 | Peter et al. ........................ 56/202 |
| 2006/0218823 A1 | 10/2006 | Olmr et al. |

* cited by examiner

*Primary Examiner* — Rodney Bonck
(74) *Attorney, Agent, or Firm* — Jenkins, Wilson, Taylor & Hunt, P.A.

(57) ABSTRACT

An auger brake clutch and drive assembly and related methods for a power equipment device such as a snowblower are provided. In use with a snowblower, the auger brake clutch assembly and related methods can be used for driving both the auger and driven wheels of a snowblower. The auger brake clutch can include a transmission wheel rotatably movable for rotating at least one wheel with the transmission wheel having a contact surface. A drive pulley can be provided that has a drive surface. The drive pulley is rotatable and configured for causing the transmission wheel to rotate when the drive surface and the contact surface of the transmission wheel are in contact. An actuation plate is movable to move the drive pulley in and out of contact with the contact surface of the transmission wheel. A friction member can be provided to be selectively rotated by the drive pulley and configured to transfer the rotation to an output shaft, which can attach for example to at least one of an auger or blower blades.

16 Claims, 8 Drawing Sheets

AUGER BRAKE CLUTCH AND DRIVE ASSEMBLY AND RELATED METHODS

TECHNICAL FIELD

The subject matter described herein relates generally to drive assemblies. More particularly, the subject matter disclosed herein relates to drive assemblies and methods for power equipment, particularly suitable for a snowblower to permit driving of both the auger and the wheel transmission of a snowblower through the use of a single drive mechanism.

BACKGROUND

Due to the depth of the snow in which snowblowers are usually used, snowblowers are typical self-propelled. Snowblowers are hard to manipulate within deep snow because of the weight of the machinery. The deeper the snow is, the harder it is to maneuver the snowblower. Self-propelled snowblowers allow advancement and regression of the snowblower at least partially under the power generated by its engine. The self-propelled snowblowers can be relatively easy to use as compared to non-self-propelled snowblowers. Through the use of self-propelled mechanisms on snowblowers, a user can devote relatively less energy in advancing the snowblower forward and concentrate more energy to steering of the device.

Typically, self-propelled snowblowers have an engine, a pair of drive wheels, an auger, and a discharge chute. The engine provides power to all power-requiring components of the snowblower, which include the drive wheels and the auger. A typical method used to transfer power from the engine to the wheels is using a friction drive that includes a drive pulley, disk, or platter which is rotatably driven by the power produced by the engine. When the friction drive is engaged, an outward side surface of the drive pulley frictionally engages the outer circumferential surface of the wheel or other circumferentially defined surface which is fixedly mounted on the axle or axles that drives the wheels. The user can engage the friction drive byway of a belt tensioning mechanism, which can include one or more belts. In such an arrangement, the belt tensioning mechanism can be actuated by depressing a drive lever located on the handlebar of the snowblower.

A typical auger mechanism in snowblowers can be driven by a worm gear drive which interfaces the auger at a medial portion thereof. Typically, in many two-stage auger mechanisms in which the auger defines a first stage and an impeller defines a second-stage, a shaft is driven by power from the engine. The shaft extends axially through the center of the impeller and rotates the impeller and extends axially outward beyond the impeller. The end of the shaft includes a worm gear which is adapted and configured to rotatably drive a corresponding gear that is keyed or otherwise fixedly connected to a medial portion of the auger. Thus, when the impeller rotates, so does the auger. In such worm gear drive configurations, the medial portion of the auger is not occupied by the auger blade. The engagement means for engaging the auger mechanism is similar to the engagement mechanism for the friction drive. A belt tensioning mechanism is provided that includes one or more belts. These belts are engaged by one or more pulleys that are driven by the engine and transfer power through the belt to the worm gear configuration which then transfers the power to the auger mechanism. The belt tension mechanism for the auger can be actuated through depressing a drive lever located on the handle similar to the drive lever for the friction wheel drive mechanism.

In order to drive both the driven wheels and the auger, two different belt mechanisms must be employed in the typical snowblower. One is used to drive the friction wheel drive mechanism and the other is to drive the auger mechanism. By requiring two different belt mechanisms to be used, a greater chance of mechanical break down within the snowblower is created. Further, a more complicated drive system which requires two different belt systems to drive the components of the snowblower is employed. Also, when the user releases the auger lever used to create tension within the belt mechanism, the auger and the impeller tend to spin until the inertial energy of the rotating parts has suitably been depleted unless a brake or similar device is used. Such an arrangement can prove dangerous for the user and for others in the vicinity of the snowblower.

Therefore, a need exists for a drive system for both the driven wheels and the auger of a snowblower that employs a simple drive mechanism for driving both the driven wheels and the auger mechanism of a snowblower.

SUMMARY

In accordance with this disclosure, novel drive systems and methods for driving both the auger and driven wheels of a power equipment device, such as a snowblower, are provided.

An object of the present disclosure therefore is to provide drive systems and methods for driving both the auger and driven wheels of a power equipment device, such as a snowblower. This and other objects, as may be apparent from presently disclosed subject matter as described herein and which is achieved in whole or in part by the presently disclosed subject matter, will be come evident as the description proceeds when taken in connection with the accompanying drawings as best described herein below.

BRIEF DESCRIPTION OF THE DRAWINGS

The full and enabling disclosure of the present subject matter including the best mode thereof to one of ordinary skill in the art is set forth more particularly in the remainder of the specification including references to the accompanying figures in which.

DETAILED DESCRIPTION

Reference will now be made in detail to the presently preferred embodiment of the present subject matter, one or more examples of which are shown in the figures. Each example is provided to explain the subject matter and not as a limitation. Features illustrated or described as part of one embodiment can be used in another embodiment to yield still a further embodiment. It is intended that the present subject matter covers such modifications and variations.

Figure 1:
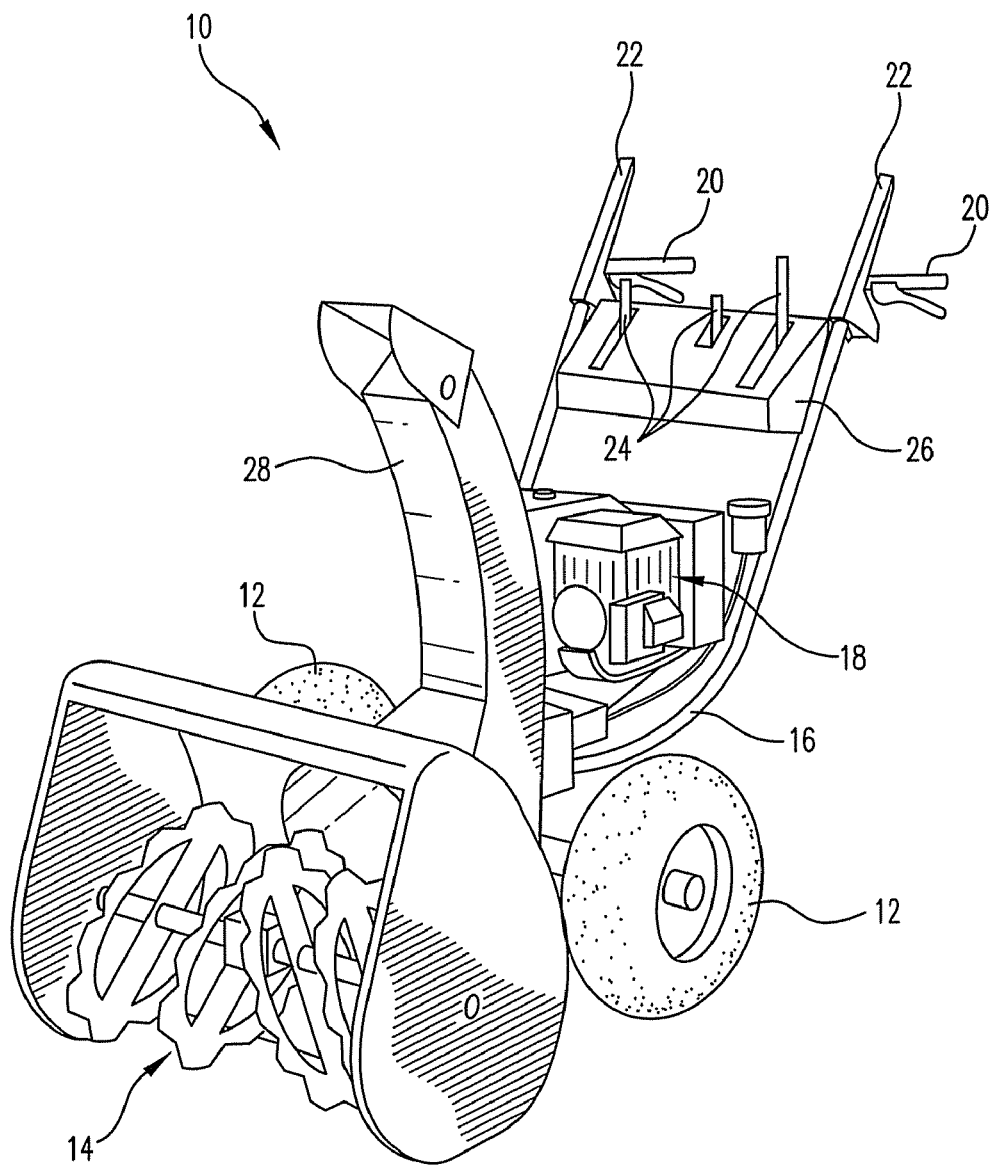
FIG. 1 illustrates a perspective view of an embodiment of a snowblower according to the present subject matter.

FIG. 1 illustrates a power equipment device shown in one aspect as a snowblower, generally designated as 10, which can use a single belt friction drive pulley to provide power to one or both wheels 12 and an auger 14 of snowblower 10. It is envisioned that the present disclosure could be used in association with other types of power equipment devices also. Wheels 12 of snowblower 10 can include tires or tracks that can be used to contact the surface over which snowblower 10 travels. Snowblower 10 can have a snow collecting and feeding auger 14 mounted on a frame 16 supported by the pair of wheels 12 by which snowblower 10 is propelled over the ground under the power an engine 18. Frame 16 can include steering handles 20 which provide operator presence controllers 22. Controllers 24 that can control the auger, speed, direction of movement, direction of the chute, or the like, can reside in a control panel 26. A control panel 26 can be provided between handles 20 to also provide control mechanisms for controlling the speed of the engine, wheels, and auger. Snowblower 10 can include a discharge chute 28 through which the snow collected by the auger 14 is shot outwardly.

FIGS. 2A, 2B, 2C, and 3 illustrate drive assembly 30 used to drive both wheels 12 (shown in FIG. 1) and auger 14 of the snowblower 10. Drive assembly 30 can provide a continuously variable transmission ("CVT") system for turning a shaft 32 that connects to the axles on which wheels 12 of snowblower 10 are attached. Further, drive assembly 30 can also selectively provide power to auger 14. Drive assembly 30 can include at least one transmission wheel 34. Transmission wheel 34 can have an aperture 36 centrally located about its axis through which shaft 32 passes. Shaft 32 can be in driving communication with the axle or axles to which the wheels 12 are secured. Transmission wheel 34 can include an outer circumference 38 which has a contact surface 39 that contacts a drive pulley 40.

Drive pulley 40 of drive assembly 30 can have a v-shaped outer circumference 42 in which a drive belt 44 can reside. Drive belt 44 can be driven by engine 18. The engine can transfer the power to belt 44 which transfers the power to drive pulley 40. Thereby, drive pulley 40 can be continuously driven while engine 18 is running. Drive pulley 40 can include a drive surface 46 on which contact surface 39 on the outer circumference 38 of transmission wheel 34 runs when transmission wheel 34 is in contact with drive pulley 40. Transmission wheel 34 can be moved along drive pulley 40 to increase and decrease the speed at which shaft 32 and wheels 12 of the snowblower are rotated. Further, transmission wheel 34 can be positioned against drive pulley 40 so as to reverse the direction of rotation of wheels 12 of the snowblower.

Variability of the transmission ratio can be accomplished by moving transmission wheel 34 along drive surface 46 of drive pulley 40. As transmission wheel 34 is rotated by the contact between contact surface 39 and the drive surface 46 of drive pulley 40, transmission wheel 34 rotates shaft 32 that can indirectly drive an axle (or axles) on which the wheels of the snowblower can reside. Shaft 32 can have an outer surface 48 that can be cylindrical or at least mostly or substantially cylindrical in shape. Alternatively, shaft 32 can have a cross-sectional shape that can be rectangular, hexagonal, octagonal, or the like. Further, shaft 32 can have a non-symmetrical cross-section.

Outer surface 48 of shaft 32 can be greased to allow movement of transmission wheel 34 along shaft 32. Contact surface 39 can therefore move along drive surface 46 of the drive pulley 40. This movement along drive surface 46 will vary the speed at which the axles of the wheels of the snowblower will turn. Further, transmission wheel 34 can include an axial bearing at its core that can engage shaft 32. An axial bearing can permit transmission wheel 34 to move along shaft 32 in linear directions to vary the transmission ratio within drive assembly 30. At the same time, an axial bearing can engage shaft 32 so as to transfer the torque created by the engagement of transmission wheel 34 to drive pulley 40 from transmission wheel 34 to shaft 32.

Drive pulley 40 can include a shaft such as a drive shaft 50 which can extend outwardly from the opposite side containing drive surface 46. As drive pulley 40 rotates, shaft 50 rotates as well. Shaft 50 can have a hub 52 around its base where it is connected to drive pulley 40.

An actuation plate can be employed to move drive pulley 40 into contact with the transmission wheel 34. Different types of actuation plates can be moved in different ways to suitably move drive pulley 40 into contact with transmission wheel 34. For example, the actuation plate can be a pivot plate 54. Pivot plate 54 can be fastened or secured to the frame 16 at a point 16A through suitable means such as nuts 56 and bolt members 58 secured to pivot plate 54 (see FIG. 3). A bearing assembly 60 can allow pivot plate 54 to be mounted on to shaft 50 of drive pulley 40 thereby permitting the shaft and drive pulley to rotate without that rotation transferring to pivot plate 54. Bearing assembly 60 can abut against shaft hub 52 and can be press fit into a pivot plate hub 62 of pivot plate 54 or on to shaft 50 or both. Alternatively, bearing assembly 62 can be retained by staking the bearing assembly to any combination of the pivot plate 54, shaft 50, and shaft hub 52.

Pivot plate 54 can include a spring tab 64 that can be securable to a spring hook 66, which is, in turn, secured to a control cable 70. Spring tab 64 can be formed at the periphery of the pivot plate 54. The spring tab 64 and pivot plate 54 can provide at least one slot, for example, slot 72 and slot 74 (see FIG. 2A), to allow hook 68 of spring hook 66 to be secured to pivot plate 54. A return spring hook 66A can also be secured in slot 72 to bias the pivot plate 54 in a direction of drive pulley 40 being disengage from transmission wheel 34 as shown in FIG. 2B. The other end of return spring hook 66A can be secured to frame 16, for example.

Figure 2A:
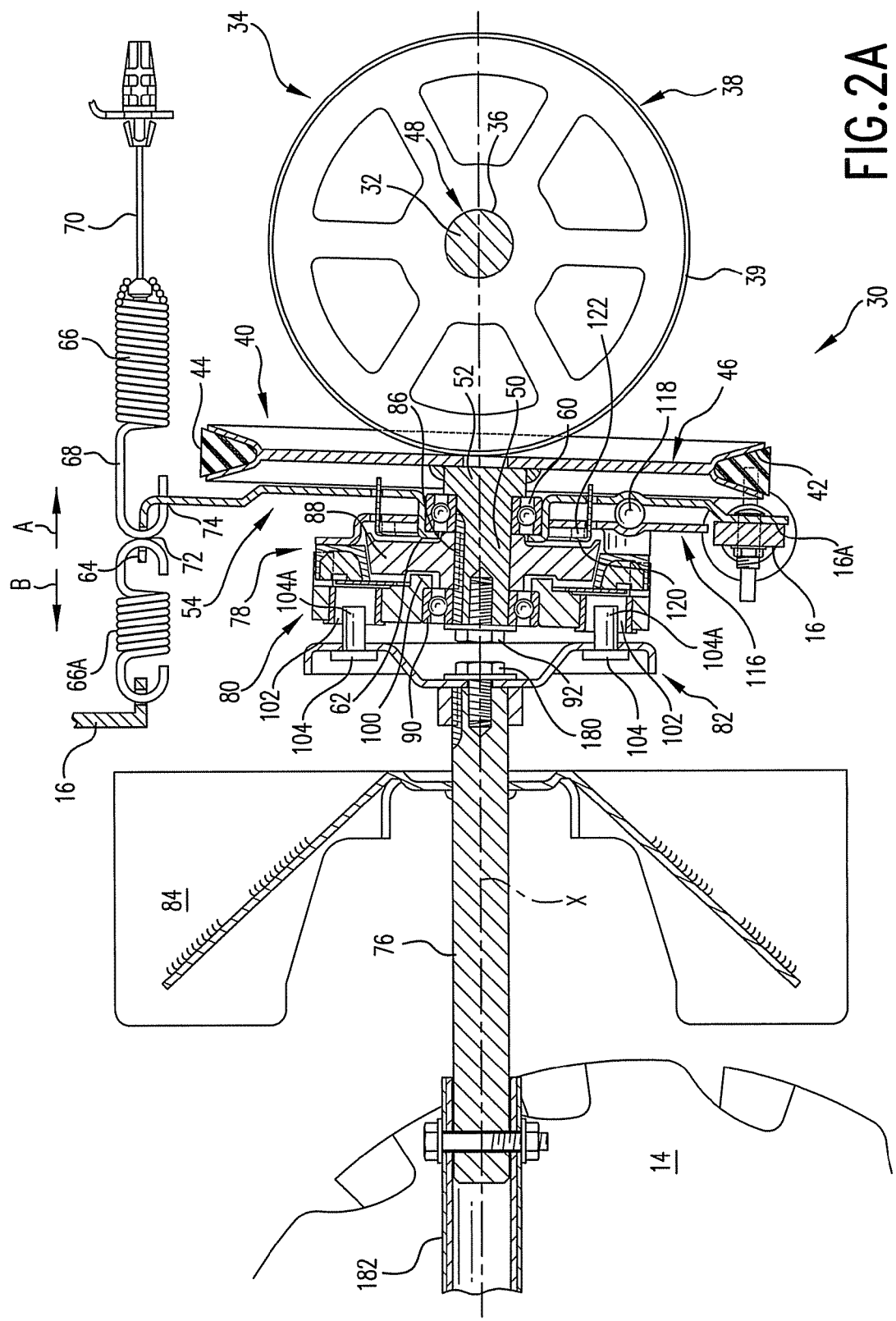
FIGS. 2A-2C illustrate cross-sectional side views of an embodiment of a drive assembly for a snowblower according to the present subject matter.
Figure 2B:
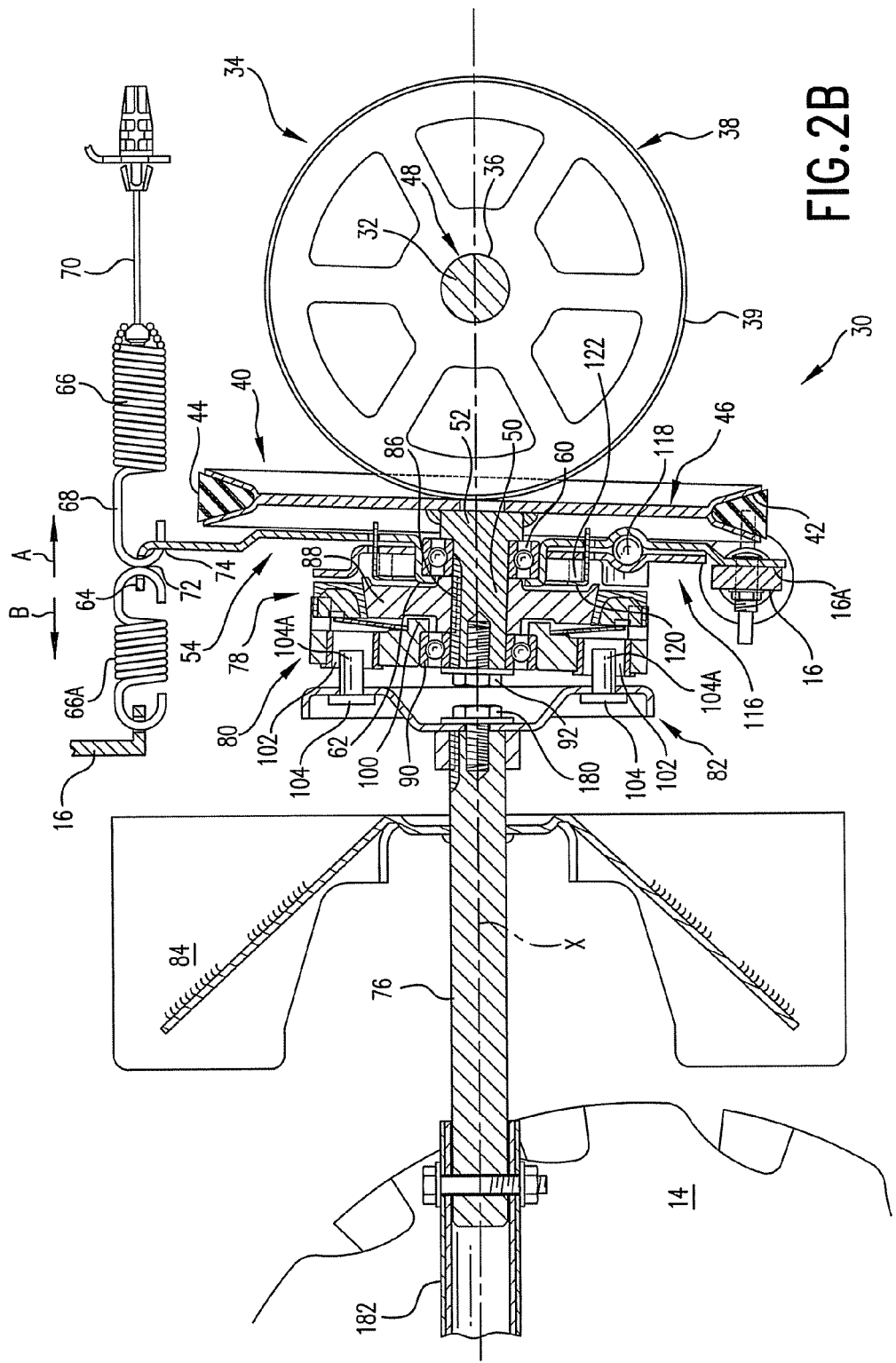
Figure 2C:
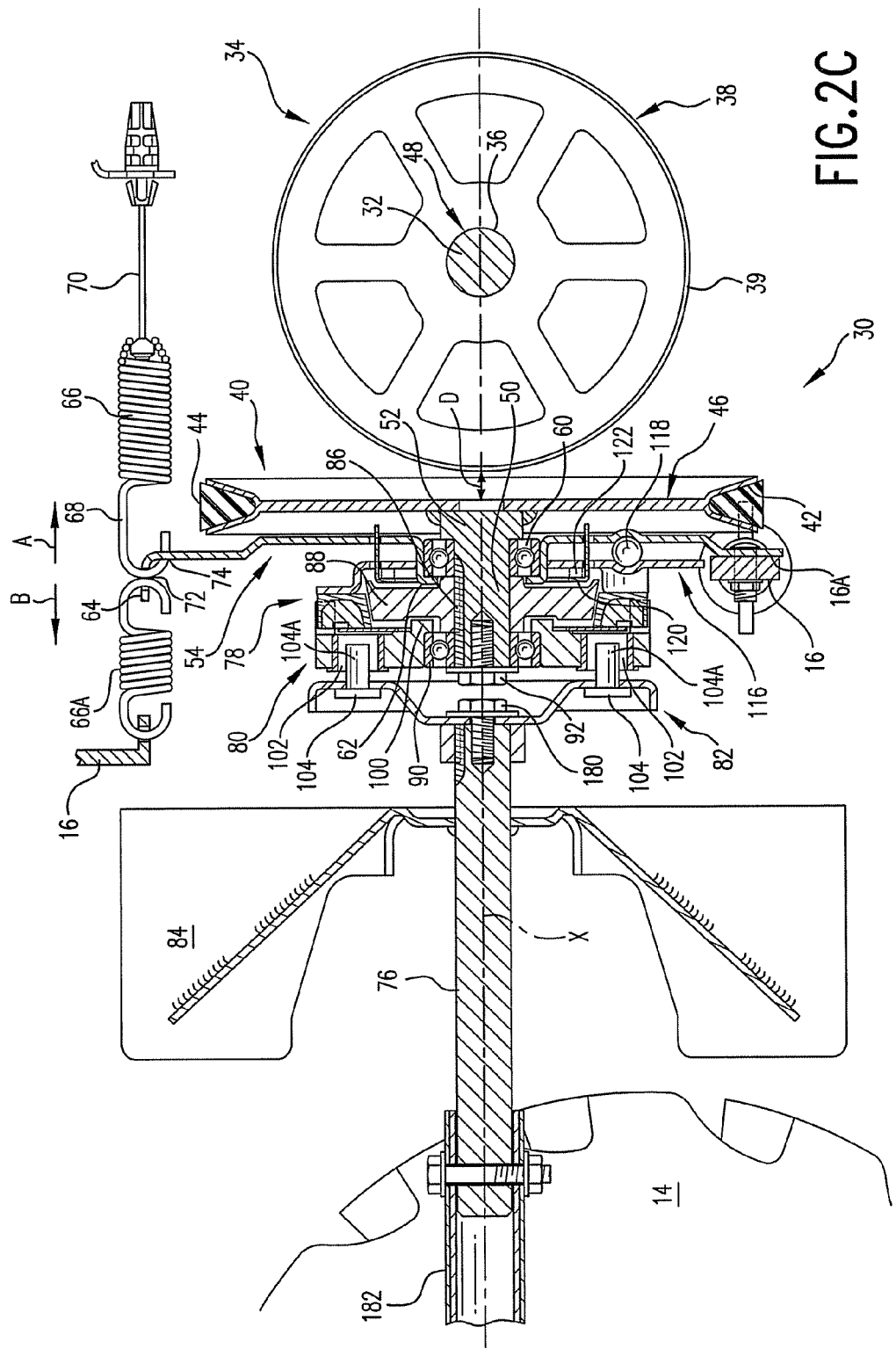

Through the use of pivot plate 54, drive pulley 40 can be moved from a contact position, or engaged position, as shown in FIGS. 2A and 2B to a non-contacting position, or disengaged position, as shown in FIG. 2C by actuation of control cable 70. Actuation of the control cable 70 in a direction A towards transmission wheel 34 causes pivot plate 54 to pivot about its connection to frame 16 at point 16A, thereby pulling drive pulley 40 with its drive pulley surface 46 in contact with contact surface 39 of transmission wheel 34. At this point, transmission wheel 34 will be rotated by drive pulley 40. Thereby, transmission wheel 34 in turn rotates shaft 32. The frictional engagement between contact surface 39 and drive surface 46 of drive pulley 40 transfers the power from drive pulley 40 to transmission wheel 34, thereby driving transmission wheel 34.

When the control cable 70 is activated in this direction, the pivot plate 54 and thereby drive pulley 40 are pulled out of a disengaged position as shown in FIG. 2C into an engaged position as shown in FIGS. 2A and 2B.

Actuation of control cable 70 in a direction B away from transmission wheel 34 allows pivot plate 54 to return to a resting position and thereby allows movement of both pivot plate 54 and drive pulley 40 from an engaged position to disengaged position as shown in FIG. 2C. In this manner, the drive surface 46 of drive pulley 40 is moved away from contact surface 39 of transmission wheel 34 and thereby disengages transmission wheel 34. At such time, wheels 12 of snowblower 10 are no longer driven by transmission wheel 34. Thereby, any forward or reverse progress under the power of engine 18 of snowblower 10 is ceased.

The distance at which the pivot plate 54 is pivoted can be limited. For example, FIG. 2C shows pivot plate 54 in a resting position with drive pulley 40 in a disengaged position. Drive pulley 40 is at a distance D from the contact surface 39 of transmission wheel 34. Thus, separation of drive pulley 40 from the transmission wheel 34 when pivot plate 54 is in a disengaged position does not have to be great. Distance D must be large enough to prevent accidental contact between drive surface 46 and contact surface 39. This limited separation distance D allows drive pulley 40 to still be driven by belt 44. By limiting the displacement of drive pulley 40, belt 44 can be put under less stress when it is moved slightly out of alignment with the pulley attached to engine 18 of the snowblower. Through the use of pivot plate 54, drive pulley 40 can engage and disengage transmission wheel 34. Further, as stated above, transmission wheel 34 can be moved along surface 46 of the drive pulley 40 to vary the speed as well as the direction of the wheels that are driven by transmission wheel 34.

Drive assembly 30 can also be used to transfer power to auger 14 of snowblower 10 (see FIG. 1) through the use of belt 44 and drive pulley 40. Drive assembly 30 further can include a coupling 78 as well as a driven member 80 that can be connected through a transfer plate 82 to an output shaft, which can be a blower shaft 76, for providing rotational torque. Blower shaft 76 can drive both blower blades 84 and the auger 14. A key 86 can affix a drive hub 88 to shaft 50 of drive pulley 40 in conventional manner. A bearing assembly 90 can mount driven member 80 on shaft 50. Bearing assembly 90 can be axially restrained on shaft 50 between a flanged bolt 92 secured to shaft 50 and the drive hub 88. Bearing assembly 90 permits the shaft 50 and drive pulley 40 to rotate relative drive member 80 as discussed further herein.

Alternatively, drive hub 88 can be secured to shaft 50 by other mechanical connections such as, for example, a built-in key, tongue and groove, springs, or snap ring. Drive hub 88 can also be integrally formed with shaft 50. Bearing assembly 90 can be secured by a press fit or staking bearing assembly 90 to either one or both of shaft 50 and drive member 80. Other similar means can also be used.

Figure 3:
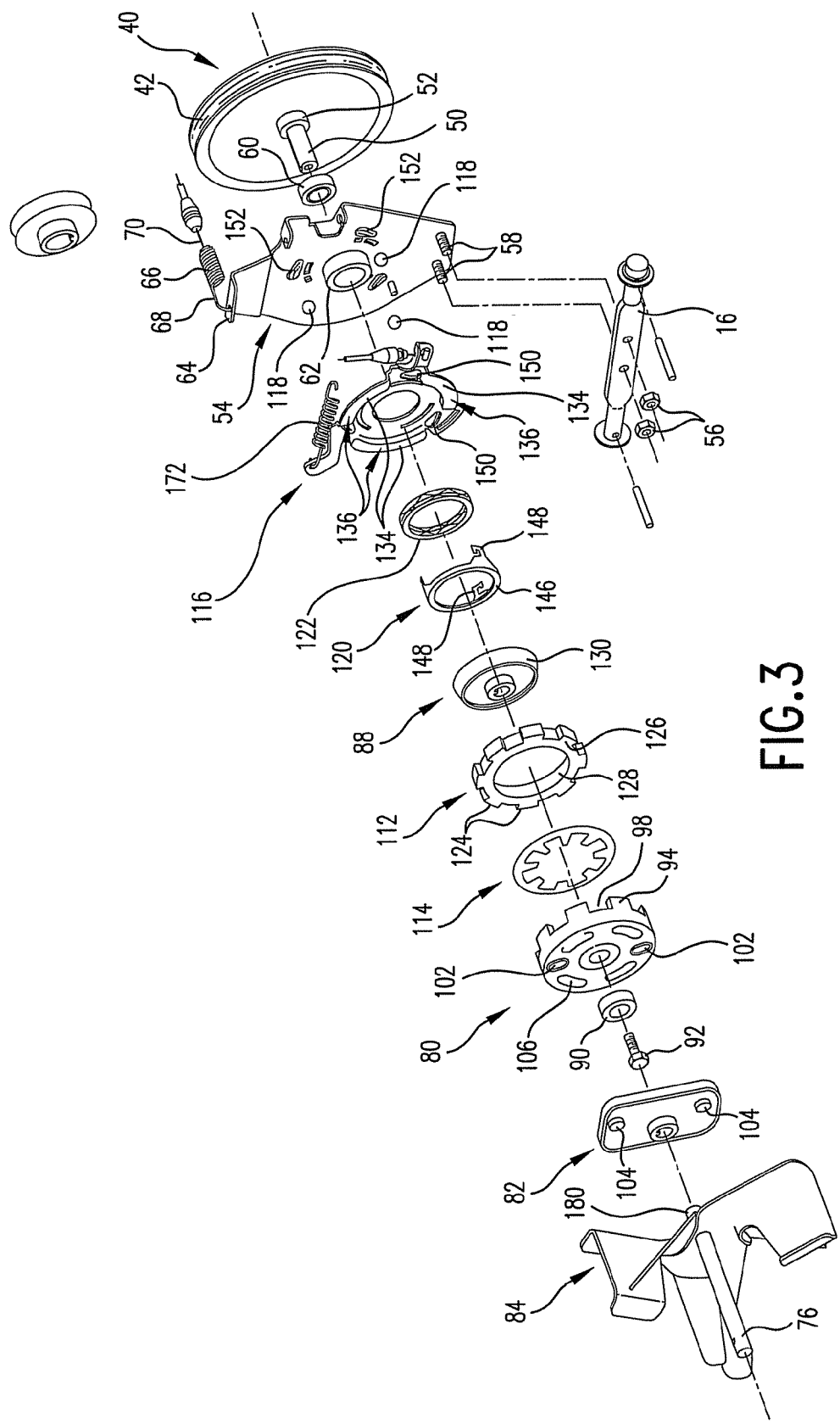
FIG. 3 illustrates an exploded perspective view of a portion of the embodiment of the drive assembly for a snowblower according to FIGS. 2A-2C.
Figure 4:
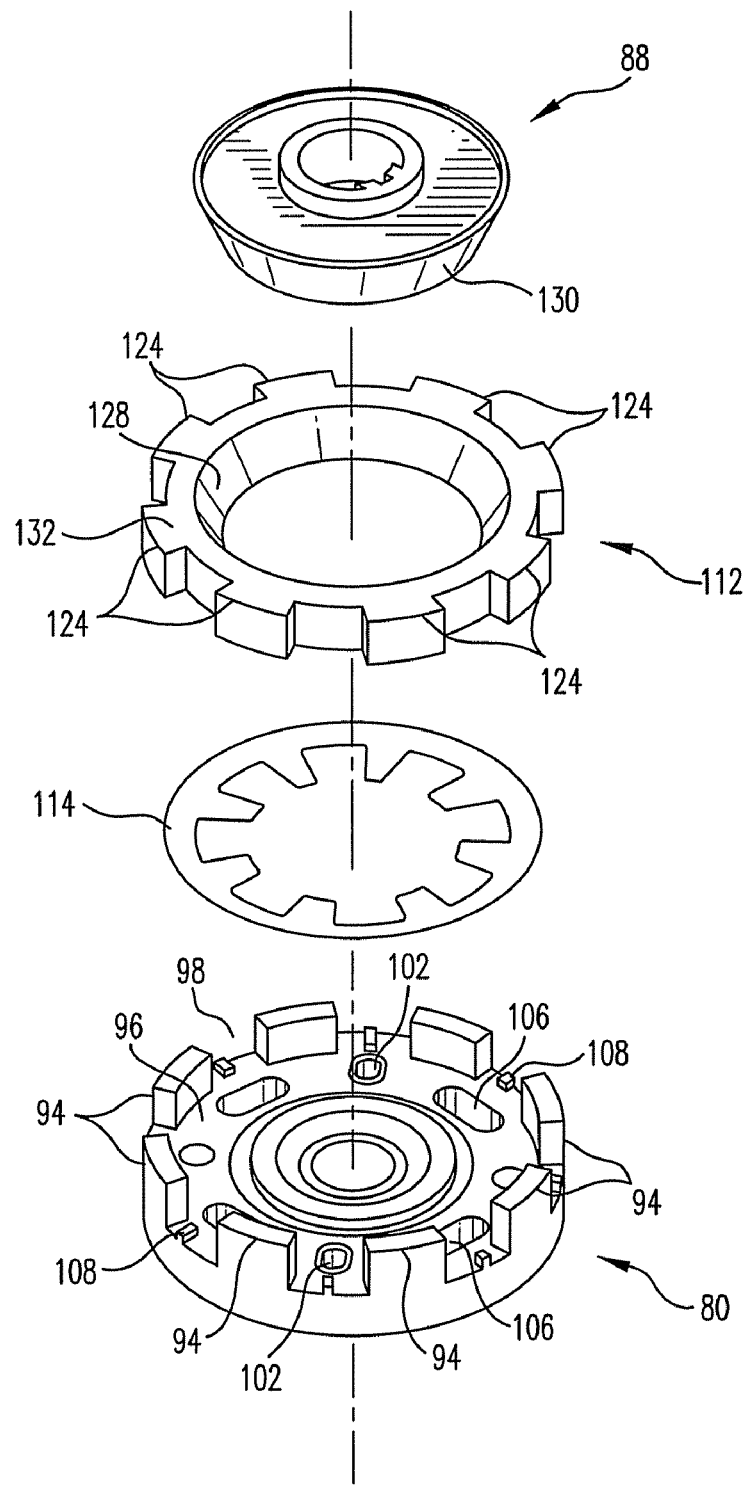
FIG. 4 illustrates an exploded perspective view of another portion of the embodiment of the drive assembly for a snowblower according to FIGS. 2A-2C.

Driven member 80 can be annular and have at least one projection 94 as seen in FIGS. 3 and 4. In this embodiment shown, driven member 80 can have a plurality of projections 94 spaced along its circumference. These projections 94 can extend axially from an upper face 96 of driven member 80 as shown in FIG. 4. The axially projections 94 adjacent to one another can define a space 98 between them. Driven member 80 can be axially located on the bearing assembly 90 by annular flange 100. Alternatively, a washer or other similar means can locate driven member 80 on the bearing assembly 90.

A plurality of slots 102 can be circumferential spaced about the driven member 80. Pins 104 of transfer plate 82 can extend into slots 102. Each pin 104 can have a stem 104A that extends out from a head of the associated pin 104 and extends into an associated slot 102. Stems 104A of pins 104 can be long enough to allow axial movement of the driven member 80 through the actuation of pivot plate 54 with control cable 70 without the stems 104A being removed from slots 102. Thereby, stems 104A ensure engagement of transfer plate 82, and thus blower shaft 76, with the driven member 80 whether pivot plate 54 is in an engaged position or a disengaged position. A plurality of holes 106 as seen in FIGS. 3 and 4 can be provided in driven member 80 to facilitate removal of any debris, such as dirt or dust. A stopper 108 can be provided on upper surface 96 of driven member 80 in at least one of the spaces 98 between projections 94. This stopper 108 can be configured as a rib or other suitable shape.

Coupling 78 can include friction member 112, a Belleville spring 114, a brake member 116, a plurality of balls 118, a retainer 120, and a compression spring 122. Compression spring 122 is configured to be compressible to a very small axial thickness. A single compression spring can be used within the coupling. This permits a compact assembly and minimizes the number of parts.

Coupling 78 is configured to simultaneously displace brake member 116 and the friction member 112 between respective engaged and disengaged positions, as will be discussed in more detail. FIGS. 2A and 2C show coupling 78 in a disengaged position such that the driven member 80 as well as the auger shaft 76 is not actively rotated, since it is not engaged by drive hub 88. FIG. 2B shows coupling 78 in an engaged position where the driven member 80 and the shaft 76 are driven by drive hub 88.

Friction member 112 can have a plurality of radially extending projections 124 along its circumference. Each radial projection 124 can extend into a corresponding space 98 of driven member 80 and abuts two adjacent axial projections 94. Axial projections 94 of driven member 80 and radial projections 124 of friction member 112 can rotationally secure friction member 112 to driven member 80. Friction member 112 can be a one piece element which can be a composite including rubber, brass, graphite or the like.

Friction member 112 can have a powder metal core for reinforcement. The powder metal core can be provided with surface ridges to rotationally lock the metal core within friction member 112. While the powder metal core adds strength to friction member 112, friction member 112 can function without it.

Belleville spring 114 can contact both upper face 96 of driven member 80 and a lower surface 126 of friction member 112. This spring 114 biases friction member 112 axially away from driven member 80. The interaction of axial projections 94 of driven member 80 and radial projections 124 of friction member 112 permits the friction member 112 to be axially displaced relative to driven member 80.

As shown in FIG. 4, clutch surface 128, which can be formed on the inner circumference of friction member 112, selectively engages an outer surface 130 on drive hub 88. Clutch surface 128 of friction member 112 can be a matching surface to outer surface 130 of drive hub 88. For example, outer surface 130 can be frusto-conical in shape and clutch surface 128 can have a matching frusto-conical shape. Forming clutch surface 128 as a frusto-conical surface can maximize surface area with a minimum radial dimension. In some embodiments, the angles of the surfaces 128 and 130 can differ slightly from one another.

Belleville spring 114 can bias clutch surface 128 into contact with outer surface 130 of drive hub 88. This frictional contact allows drive hub 88 to drive driven member 80. A brake surface 132 is provided on the surface of friction member 112 proximal to brake member 116 as shown in FIGS. 2A and 4. Brake surface 132 and clutch surface 128 can be provided on separate (the upper and inside) surfaces of friction member 112 to save space and minimize the number of elements needed for coupling 78.

Figure 5:
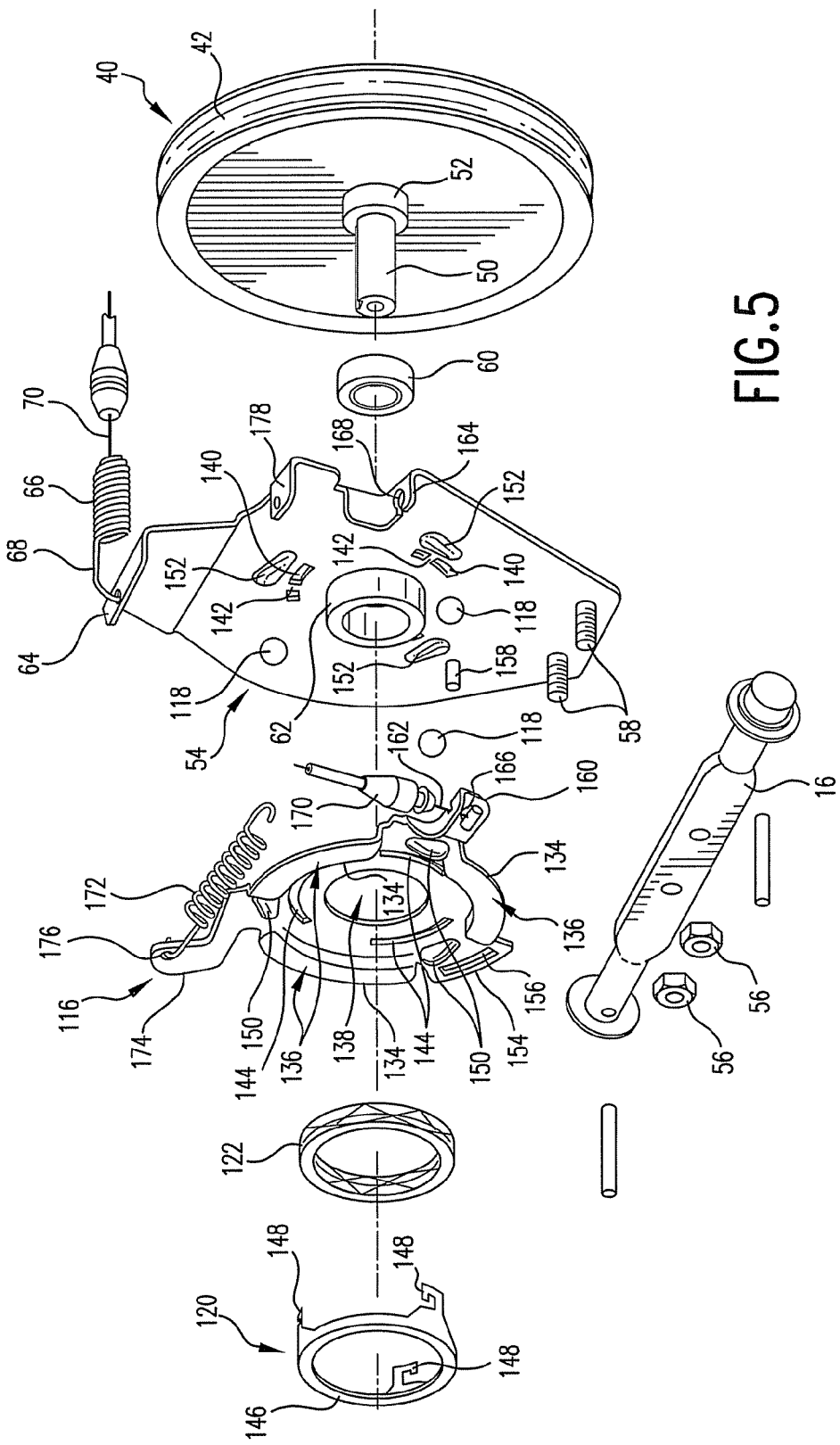
FIG. 5 illustrates an exploded perspective view of a further portion of the embodiment of the drive assembly for a snowblower according to FIGS. 2A-2C.

As seen in FIGS. 3 and 5, brake member 116 has at least one brake shoe 134. In the embodiment shown, brake member 116 has a plurality of brake shoes 134 circumferentially spaced about its periphery. Brake shoes 134 extend axially away from pivot plate 54 when brake member 116 is in position along shaft 50 and towards friction member 112 and driven member 80. Each brake shoe 134 has a braking surface 136 that can selectively engage brake surface 132 on the friction member 112.

Pivot plate 54 can be coaxially disposed next to brake member 116. For example, brake member 116, pivot plate 54 and drive pulley 40 can be configured to be aligned coaxially about an axis X passing through shaft 50 of drive pulley 40. In such a configuration, brake member 116 can move axially along the axis X of shaft 50 to actuate contact between brake member 116 and brake surface 132 of friction member 112 and to release brake member 116 from brake surface 132 of friction member 112. Further, brake member 116 can have a centrally placed aperture 138 that extends through the brake member 116.

Pivot plate hub 62 can slidably engage brake member 116 through aperture 138. In this manner, brake member 116 is movable along and rotatable about hub 62 of pivot plate 54. Pivot plate 54 has a plurality of circumferentially spaced arcuate slots 140. A rib 142 extends across each respective one of the arcuate slots 140 as shown as in FIGS. 3 and 5. A plurality of arcuate slots 144 are circumferentially spaced on brake member 116. A portion of each brake member arcuate slot 144 overlaps a corresponding pivot plate arcuate slot 140 with the remainder of the brake member arcuate slot 144 extending beyond the corresponding pivot plate arcuate slot 140.

Retainer 120 can include a flat annular disk 146 with a plurality of hooks 148 extending axially from the circumference of flat angular disk 146 of retainer 120. Retainer 120 can be coaxially disposed with pivot plate 54 and brake member 116 such that brake member 116 is disposed between pivot plate 54 and flat annular disk 146 of retainer 120. Flat annular disk 146 of retainer 120 is readily disposed inside of brake shoe 134. Each hook 148 projects through a corresponding arcuate slot 144 in brake member 116 and a corresponding arcuate slot 140 of pivot plate 54. Each hook 148 is secured on a respective rib 142 of pivot plate 54.

Retainer 120 can be coated with a low friction material, such as polytetraflouroethylene (PTFE) or nylon. This low friction coating allows for an easier return of retainer 120 to its neutral position, as discussed further herein.

Compression spring 122 can be positioned between the side of brake member 116 and the hook side surface of annular disk 146 of retainer 120. Retainer 120 connects brake member 116 to pivot plate 54 and compression spring 122 biases brake member 116 towards pivot plate 54.

A plurality of ball ramp assemblies form a connection between brake member 116 and pivot plate 54. Each ball ramp assembly can comprise inclined ball ramp surfaces 150 on brake member 116 and inclined ball ramp surfaces 152 on pivot plate 54. Each ball ramp surface 150 on brake member 116 opposes a corresponding ball ramp surface 152 on pivot plate 54 and is inclined in the opposite direction relative to its ball ramp surface 152 on pivot plate 54. A ball 118 is moveably captured between each pair of opposed ball ramp surfaces 150, 152.

A tab 154 can extend radially from the circumference of brake member 116. An arcuate tab slot 156 is formed in tab 154. Pivot plate 54 can have a projection 158 that extends axially through tab slot 156 in tab 154 of brake member 116. The width of the projection 158 is less than the arcuate length of the tab slot 156 in tab 154. In this manner, the space between projection 158 and the walls of tab slot 156 when brake member 116 and pivot plate 54 are assembled together permits rotation of brake member 116 about shaft 50.

Alternatively, other couplings that convert rotary motion to axial motion can be used instead of the ball ramp surface assembly, such as a cam and cam follower assembly. Other embodiments can forgo any rotary motion of the brake member such as a link system that provides a linear displaceable link in contact with brake member.

Figure 6:
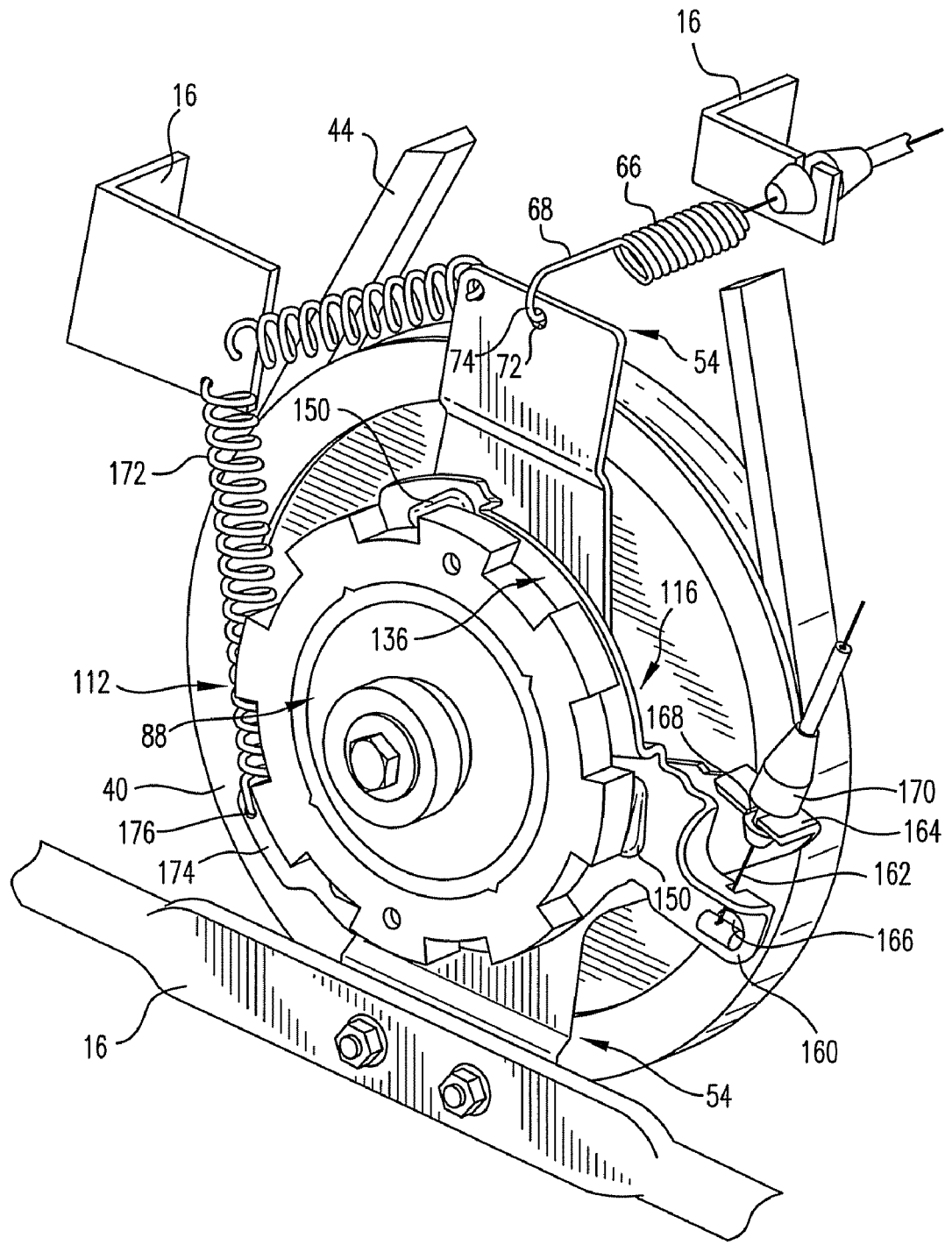
FIG. 6 illustrates a perspective view of another embodiment of a drive assembly for a snowblower according to the present subject matter.

Referring to FIGS. 3, 5 and 6, brake member 116 has a control cable flange 160 to which a control cable 162 can be secured. Further, pivot plate 54 has a guide flange 164 that extends from its periphery and can be placed in alignment with control cable flange 160 of brake member 116.

Control cable flange 160 of brake member 116 can have a locking aperture 166 through which cable 162 can be secured. Control cable flange 160 and locking aperture 166 each can be shaped in a conventional manner to ensure that control cable 162 is removably securable to brake member 116. Control cable 162 can also pass through a guide aperture 168 in guide flange 164 of pivot plate 54. This allows guidance and alignment of control cable 162 during actuation of brake member 116. A sheath 170 of control cable 162 can be secured in guide aperture 168 of pivot plate 54 as shown in FIG. 6. Control cable flange 160 of brake member 116 can abut against guide flange 164 of pivot plate 54 when control cable 162 is actuated in a direction towards guide flange 164. The other end of control cable 162 can be secured to a control handle or panel, where control cable 162 can be actuated by the operator of the snowblower.

A coil spring 172 can be secured to a spring tab 174 that extends from the periphery of brake member 116. Spring tab 174 has a hole 176 which accepts the end of coil spring 172. The other end of coil spring 172 can be secured to a non-rotational feature within the snowblower. For example, as shown in FIGS. 3 and 5, pivot plate 54 has a spring tab 178 formed at the periphery of pivot plate 54. The other end of coil spring 172 can be attached to spring tab 178. Alternatively, as shown in FIG. 6, coil spring 172 can be attached to a portion of frame 16 of the snowblower. Through the use of coil spring 172 and control cable 162, brake member 116 can be rotated so that driven member 80 can be engaged and disengaged.

Operation of the brake and clutch mechanism used to selectively drive auger 14 of snowblower 10 will now be described with references to FIGS. 1 through 6.

Actuation of control cable 162 imparts a rotational motion to brake member 116. This rotational motion, in turn, causes each ball ramp surface 150 of brake member 116 to move relative to the associated ball 118. Each ball 118 rolls along the associated oppositely inclined ball ramp surface 152 of pivot plate 54. Thus, each ball 118 moves from the narrower/shallower end of each ball ramp surface 150, 152 to the wider/deeper end. This movement of balls 118 allows brake member 116 to move toward pivot plate 54 as shown in FIG. 2B as brake member 116 rotates against the bias of compression spring 172. In this manner, braking surface 136 of brake member 116 releases brake surface 132 of friction member 112.

This motion gradually disengages braking surface 136 of brake member 116 from brake surface 132 of friction member 112. Simultaneously, clutch surface 128 of friction member 112 is gradually brought into engagement with the outer surface 130 due to the bias of Belleville spring 114. This motion eventually completely engages driven member 80 with the drive hub 88 and completely disengages braking surface 136 of brake member 116 from brake surface 132 of friction member 112 as illustrated in FIG. 2B.

Actuation of control cable 162 in the opposite direction rotates brake member 116 in the opposite direction with the help of the bias of compression spring 172. This rotation, in turn, displaces brake member 116 from friction member 112 and toward pivot plate 54 as each ball 118 moves from the wider/deeper end of each ball ramp surface 150, 152 to the narrower/shallower end. This movement of balls 118 forces brake member 116 away from pivot plate 54 as shown in FIGS. 2A and 2C as brake member 116 rotates with the bias of compression spring 172. In this manner, braking surface 136 of brake member 116 engages brake surface 132 of friction member 112.

Further, rotation of brake member 116 by this displacement of control cable 162 and bias of compression spring 172 causes braking surface 136 to axially displace the friction member 112 toward driven member 80 against the bias of Belleville spring 114. This downward movement of friction member 112 gradually disengages clutch surface 128 from the outer surface 130 of drive hub 88. This motion eventually completely disengages driven member 80 from drive hub 88 and retards the rotation of driven member 80. At this point, the stopper 108 is engaged by the bottom surface 126 of friction member 112, as illustrated in FIGS. 2A and 2C.

Rotation of brake member 116 relative to pivot plate 54 is limited by the interaction of projection 158 of pivot plate 54 with tab slot 156 in tab 154 of brake member 116. One end of tab slot 156 defines a first limit of brake member 116 and the other end of the tab slot 156 defines a second limit of brake member 116. When brake member 116 is in the first limit position, clutch surface 128 of friction member 112 is disengaged from the outer surface 130 of drive hub 88 and braking surface 136 of brake member 116 is engaged with brake surface 132 of friction member 112. When the brake member 116 is in the second limit position, clutch surface 128 of friction member 112 is engaged with outer surface 130 of drive hub 88 and braking surface 136 is disengaged from brake surface 132 of friction member 112.

The force exerted by coil spring 172 is directed on brake member 116 in such a manner as to overcome the bias created by both compression spring 122 and Belleville spring 114. Thus, coil spring 172 biases brake member 116 toward the first limit position. This bias ensures that driven member 80 is disengaged from drive hub 88 and that brake member 116 holds driven member 80 against rotation until an operator provides input to brake member 116.

Other embodiments of the various elements described herein can be utilized in accordance with the present invention. For example, the brake surface 132 could be formed on the lower radial face of the friction member 112. Another embodiment of the friction member 112 could locate brake surface 132 on the outer circumference of friction member 112 as a frusto-conical shape and clutch surface 128 could be formed on either radial face of friction member 112. The control cable 162 can be replaced by a rigid link secured to one end of brake member 116 and connected at the other end to the control handle by a linkage.

Thus, in the manner described above, drive pulley 40 which is used to drive transmission wheel 34, and thus the wheels 12 of snowblower 10, can also be used to drive blower blades 84 and auger 14. As stated above, driven member 80 can have slots 102 in to which pins 104 of the transfer plate 82 can extend. Pins 104 can have stems 104A that extend a distance into slots 102 that is greater than the displacement of pivot plate 54 from its disengaged position (see FIG. 2C) to its engaged position (see FIGS. 2A and 2B). In such a construction, stem 104A of pins 104 are movable within slots 102 without having the stems 104A exiting slots 102. Transfer plate 82 can be secured to blower shaft 76 by a flanged bolt 180. Thus, when driven member 80 is engaged and rotating, this rotation is transferred to transfer plate 82 and onward up to blower shaft 76. Blower shaft 76 rotates the blower blades 84 to feed discharge chute 28. Rotation of blower shaft 76 can be translated to the shaft on which the auger 14 resides in a known manner. When driven member 80 is disengaged such that the rotation of drive pulley 40 is not transferred to driven member 80, the rotation of blower shaft 76, and thus blower blades 84 and auger 120, is stopped.

Control cable 162 can be secured to control panel 26 as described above to allow the operator the opportunity to engage and disengage driven member 80 thereby stopping and starting the rotation of auger 14 and blower blades 84. Similarly, control cable 70 used to engage transmission wheel 34 with drive pulley 40 can also be connected to controls on control panel 26. In the embodiments described above, both the wheels 12 of snowblower 10 and auger 14 of snowblower 10 can be control by a single drive pulley 40 and single belt 44.

The embodiments of the present disclosure shown in the drawings and described above are exemplary of the numerous embodiments that can be made within the scope of the appending claims. It is contemplated that the configurations of an adjustable transmission drive assembly can comprise numerous configurations other than those specifically disclosed. The scope of a patent issuing from this disclosure will be defined by the appending claims.

What is claimed is:

1. A drive system comprising:
   a transmission wheel rotatably movable for rotating at least one wheel, the transmission wheel having a contact surface;
   a drive pulley having a drive surface, the drive pulley being rotatable and configured for causing the transmission wheel to rotate when the drive surface and the contact surface of the transmission wheel are in contact;
   an actuation plate comprising a pivot plate, the actuation plate being movable to move the drive pulley in and out of contact with the contact surface of the transmission wheel;
   a friction member selectively rotatable by the drive pulley and configured to transfer rotation from the drive pulley to an output shaft; and
   a brake member in operable communication with the pivot plate;
   wherein the friction member provides a clutch surface and a brake surface, the brake member being positioned proximate to the brake surface of the friction member.

2. The drive system according to claim 1, wherein the pivot plate includes a hub and the drive pulley includes a drive shaft extendable through the hub of the pivot plate such that the drive shaft is rotatable within the hub of the pivot plate.

3. The drive system according to claim 2, wherein the brake member is configured to rotate about the hub of the pivot plate to actuate contact between the brake member and the brake surface of the friction member and to release the brake member from the brake surface of the friction member.

4. The drive system according to claim 2, further comprising a drive hub secured to the drive shaft of the drive pulley, the drive hub configured to rotate with the drive pulley and configured to contact the clutch surface of the friction member when the brake member is not actuated to contact the brake surface of the friction member.

5. The drive system according to claim 4, further comprising a spring that biases the friction member toward the drive hub.

6. The drive system according to claim 1, wherein the pivot plate is configured to pivot between a resting position in which the drive pulley is moved into a disengaged position relative to the transmission wheel and an actuated position in which the drive pulley is moved into an engaged position relative to the transmission wheel.

7. The drive system according to claim 6, further comprising a driven member in operable communication with the friction member, such that, when the friction member is rotated, the driven member is also rotated.

8. The drive system according to claim 7, further comprising a transfer plate having at least one pin configured to slidably engage the driven member and configured to rotate the output shaft.

9. The drive system according to claim 1, further comprising:
   at least one ball ramp assembly connecting the pivot plate to the brake member; and
   a spring between the pivot plate and the brake member.

10. The drive system according to claim 1, further comprising a retainer connected to the pivot plate for holding the brake member proximal to the pivot plate.

11. A drive system for a snowblower, comprising:
   a pivot plate having a hub;
   a drive pulley having a drive shaft that is extendable through the hub of the pivot plate, the drive pulley providing a drive surface and configured to rotate;
   a transmission wheel configured to selectively rotate at least one wheel, the transmission wheel having a contact surface that is selectively contactable with the drive surface of the drive pulley to rotate the transmission wheel;
   a friction member configured to be selectively rotated by the drive pulley and configured to transfer the rotation to at least one of an auger or blower blades, the friction member providing a clutch surface and a brake surface;
   a brake member configured to rotate about the hub of the pivot plate to actuate contact between the brake member and the brake surface of the friction member and to release the brake member from the brake surface of the friction member; and
   the pivot plate being pivotal between a resting position in which the drive pulley is moved into a disengaged position relative to the transmission wheel and an actuated position in which the drive pulley is moved into an engaged position relative to the transmission wheel.

12. The drive system according to claim 11, wherein the brake member, the pivot plate and drive pulley are configured to be aligned coaxially about an axis passing through the drive shaft of the drive pulley, such that the brake member is moveable axially along the axis of the drive shaft to actuate contact between the brake member and the brake surface of the friction member and to release the brake member from the brake surface of the friction member.

13. The drive system according to claim 11, further comprising a drive hub secured to the drive shaft of the drive pulley, the drive hub configured to rotate with the drive pulley and configured to contact with the clutch surface of the friction member when the brake member is not actuated to contact the brake surface of the friction member.

14. The drive system according to claim 11, further comprising a driven member in operable communication with the friction member, such that, when the friction member is rotated, the driven member is also rotated.

15. The drive system according to claim 14, further comprising a transfer plate having at least one pin configured to slidably engage the driven member and configured to rotate at least one of an auger or blower blades.

16. The drive system according to claim 11, further comprising:
   at least one ball ramp assembly connecting the pivot plate to the brake member; and
   a spring between the pivot plate and the brake member.

* * * * *